Patented July 1, 1947

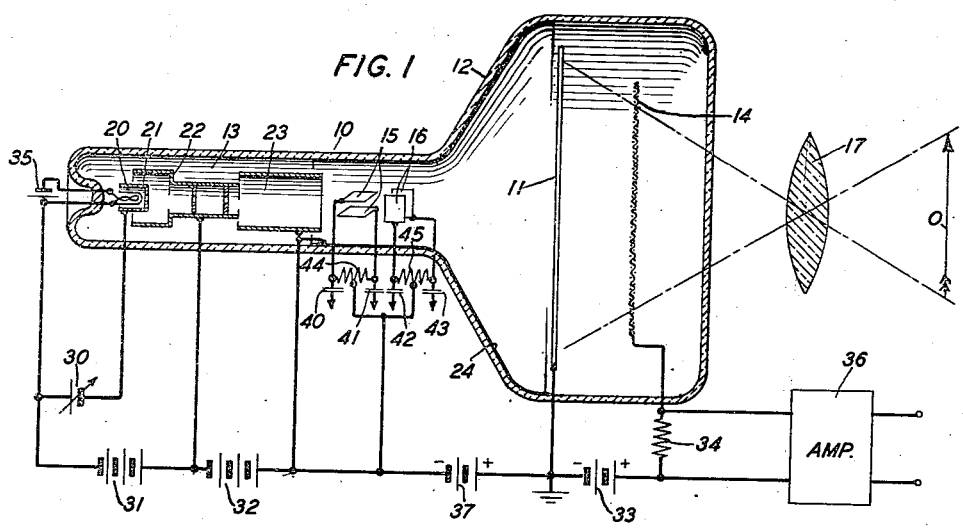

2,423,124

UNITED STATES PATENT OFFICE 2,423,124

ELECTRO-OPTICAL DEVICE

Gordon K. Teal, Summit, N. J., assignor to Bell Telephone Laboratories, Incorporated, New York, N. Y., a corporation of New York Application January 30, 1943, Serial No. 474,205

8 Claims. (Cl. 250—167)

1

This invention relates to electro-optical devices and, more specifically, to photo-E. M. F. devices for controlling electron beams.

A photo-E. M. F. device may be defined as a material, combination of materials, or cell which when electromagnetic radiations of certain short wave-length, like those, for example, to which the eye is sensitive, are applied thereto will produce an electromotive force across its terminals, or across two portions thereof which can serve as terminals. In the present invention, in one of its primary aspects, the voltage set up between the terminals of a photo-E. M. F. device or cell when such waves are applied thereto is used to control an electron beam. In describing the invention, such waves will be called "light," but this term is used in a broad sense to be inclusive of radiations to which the eye is not sensitive.

It is an object of the present invention to provide a novel arrangement wherein electrons of a beam or stream are controlled by the voltage appearing across the terminals of a photo-E. M. F. device in response to light radiations applied thereto.

It is another object to provide a novel electro-optical device in which there is included photo-E. M. F. means for controlling secondary electrons.

In accordance with the invention, there is provided an electro-optical device wherein a beam or stream of electrons is controlled by means of potentials generated by photo-E. M. F. elements, which photo-E. M. F. elements are subjected to applied light radiations.

In accordance with a preferred embodiment, chosen by way of example to illustrate the principles of novelty of the present invention, a television electron camera tube is provided which comprises an evacuated envelope enclosing means for generating a beam of electrons, and an apertured target for said beam comprising an apertured metal screen or plate carrying on the side remote from the beam generating means a multiplicity of elemental photo-E. M. F. cells. An image of an object is projected upon the photo-E. M. F. cells and the other side of the target is scanned with the beam of electrons.

The principle of operation of this tube is as follows: The beam generating means produces a relatively high velocity beam and this is caused to scan the side of the target remote from the photo-E. M. F. cells. These cells have applied thereto light radiations from the object to be televised and there is produced across each cell a voltage proportional to the light striking the

2 cell from a corresponding elemental area of the object. The scanning beam strikes the target plate and causes the emission of secondary electrons which pass through the apertures in the target member to a collecting electrode placed within the tube between the target and the object. The number of electrons which pass through any aperture is controlled by the voltage across the neighboring elemental photo-E. M. F. cells. The collecting electrode is connected to a signal resistor through which passes the video current, which is amplified by any suitable amplifier.

While the invention in its principal aspects relates to electron camera tubes for television or to novel targets therefor, it will be appreciated that it is not limited to this, as the principle of controlling a beam of electrons (and more specifically the flow of electrons through an apertured member) in response to the voltage produced by a photo-E. M. F. cell can have other uses, as in light-controlled devices for switching, for example.

The invention will be more readily understood by referring to the following description taken in connection with the accompanying drawing forming a part thereof, in which:

Fig. 1 is a schematic representation of a cathode ray tube of this invention and certain of its associated circuits;

Fig. 2 is a schematic view showing, in greatly enlarged form, a portion of the target and of the electron collecting electrode of the tube shown in Fig. 1; and Fig. 3 is an enlarged front view of a portion of the target.

Referring more particularly to the drawing, Fig. 1 shows, by way of example to illustrate the invention, a cathode ray television transmitter tube 10 employing a two-sided mosaic target 11 containing photo-E. M. F. elements. The tube 10 comprises an evacuated container 12 enclosing the mosaic target 11, an electron gun 13 for generating, focussing and accelerating a beam of high velocity electrons towards this target, a secondary electron collecting electrode 14 on the side of the target 11 remote from the electron gun 13, and two sets of electrostatic deflecting plates 15 and 16 for causing the beam of electrons to scan every elemental area in turn of a field of view on the mosaic target 11. Radiations from an object or field of view O are applied to the side of the mosaic target 11 remote from the electron gun by means of any suitable optical system represented schematically by the lens 17.

The electron gun 13 preferably comprises a cathode 20, a control electrode or member 21, a first anode member 22, and a second and final anode member comprising a cylindrical member 23 and a coating 24 of conducting material on the inside walls of the envelope 12 extending from the region of the cylinder 23 to the region of the mosaic target. The collecting electrode 14 for the secondary electrons emitted from the target 11 when it is struck by the beam of high velocity electrons preferably consists of mesh material or, if desired, it may consist of a ring of metallic material.

The control electrode 21 is placed at any suitable negative potential with respect to the potential of the cathode 20 by means of an adjustable source 30; and the first anode 22 and the final anode 23, 24 are placed at appropriate positive potentials with respect to the cathode 20 by means of the source 31 and the source 32. As an example, the final anode 23, 24 can be about 1,000 volts positive with respect to the cathode and the first anode 22 can be 300 volts positive with respect to the cathode. Any suitable source 35 can be utilized to heat the cathode 20. The negative terminal of the source 31 is connected to the cathode 20 and the positive terminal thereof is connected to the first anode 22, while the negative terminal of the source 32 is connected to the positive terminal of the source 31 and the positive terminal of source 32 is connected to the second anode 23, 24. Preferably the positive terminal of the source 32 is connected to ground through a source 37 which is used to make the apertured plate 50 (see Fig. 2) of the target 11 positive with respect to the final anode of the electron gun for a purpose which will be pointed out hereinafter. The voltage of this source 37 can be, for example, 20 to 50 volts. The apertured plate 50 is connected to ground and is also connected through a source 33 and a signal resistor 34 to the collecting electrode 14. Any suitable amplifier 36 is connected to the signal resistor 34 and is in turn connected to the other elements of the television transmitter circuit which prepare the video current for transmission to the receiving station. The potentials applied to the various electrode members and their configuration and shape are such that a beam of focussed high velocity electrons strikes the target 11 and this beam is deflected over a suitable field thereon by means of appropriate potentials applied to the deflecting plates 15 and 16 by electrostatic sweep circuits (not shown) to produce secondary electrons, the action of which will be considered more fully below. As examples of satisfactory sweep circuits, reference may be made to Patent No. 2,178,464, dated October 31, 1939, to M. W. Baldwin, Jr., which discloses balanced electrostatic sweep circuits suitable for this purpose. Connections can be made from the balanced sweep circuits to the pairs of plates 15 and 16 by means of coupling condensers 40, 41 and 42, 43, respectively, of about one microfarad capacity each. Coupling resistances 44 and 45 of the order of many megohms each are respectively connected across the pairs of plates 15 and 16. The midpoints of the resistances 44 and 45 are connected to the positive terminal of the source 32 so that the average of the potentials of the deflecting plates does not deviate more than slightly from the potential of the anode 23, 24. This relationship is maintained to avoid changes in the sensitivity of the deflecting system and the consequent distortion of the image which would otherwise result. For more complete descriptions of the advantages of balanced sweep circuits for use with cathode ray television tubes, reference is made to the above-mentioned Baldwin patent and also to Patent 2,209,199, issued July 23, 1940, to Frank Gray.

Reference will now be made to Figs. 2 and 3 which are enlarged schematic views of a preferred form of mosaic target 11. Fig. 2 is a schematic side view, in cross section, of a portion of the target 11, while Fig. 3 is an enlarged showing of a portion of the target 11, viewed from the right in Fig. 2, to show the general relationship of the apertures 52 in the target and the photo-E. M. F. cells 51 thereof. Certain dimensions in Figs. 2 and 3 have been exaggerated at the expense of others in order to more clearly show the screen structure. The mosaic target 11 preferably comprises an apertured plate 50 of any suitable material, such as nickel, carrying thereon on the side remote from the beam generating means a multiplicity of photo-E. M. F. cell elements 51, each aperture 52 in the plate being effectively surrounded by cell elements. Each of the elements 51 can comprise, for example, a small copper oxide photo-E. M. F. cell which cell, as is well known in the art, generally comprises a layer of copper, a semiconducting layer of cuprous oxide thereon treated by means well known in the art to produce on the semiconducting layer a blocking layer, and a thin semitransparent conducting element such as silver or gold covering the blocking layer.

A satisfactory method of making the target structure 11 of the tube is as follows: A perforated screen or plate 50 of nickel or any other suitable metal, made by any well-known commercial process, is insufflated with a suitable protective covering material, such as asphaltum particles small in comparison with the diameter of the screen. The screen 50 has, for example, 100 to 200 or more apertures per inch. It is slightly warmed to cause the asphaltum deposit to flow and produce a multiplicity of dot-like elements fairly evenly distributed over the surface of the plate. The back of the plate is then covered with asphaltum which can be done without the asphaltum going completely through to the insufflated side by pouring asphaltum varnish of the correct consistency on the back of the screen and allowing it to dry. A silver or other suitable metallic mask is then plated on the unprotected areas of the plate 50, a thin greasy or waxy coating having been first applied to the target so that the silver can be later stripped off. All the asphaltum is then dissolved in benzene. A copper film is then deposited on the plated side of the member 50 by evaporation. The silver mask or screen is then carefully stripped away leaving small dots of copper where the asphaltum dots had formerly been. The copper dots are then oxidized by any suitable means and the oxide surfaces treated by electron or ion bombardment to produce a blocking layer for each small cell. A very thin semitransparent film of gold or other suitable conducting material is evaporated onto the small cell surfaces. By this process there is produced a number of small sandwich-type of photo-E. M. F. cells distributed at random over the screen. If desired, the copper dots can be oxidized, treated, and the semitransparent film evaporated thereon before the silver mask is stripped off. These cells are of the type known as a "front wall" cell. In these cells, a negative potential with respect to the plate 50 is acquired by the semitransparent metal layer when light radiations are applied to the cells from the object O. If desired, the cells can be produced by any suitable process which produces a "back wall" type of cell but cells of this latter type are generally not as sensitive as those of the "front wall" type. If the cells 51 are of the "back wall" type, the semi-transparent metal layer becomes positive with respect to the plate 50 when light radiations are applied to the cells. The arrangement in accordance with this invention is operable with either type of cell and, moreover, is not limited to the use of the copper oxide type or of the silicon-silicon oxide type now to be described.

If desired, the surface of the target nearer the beam can be treated in a manner to enhance the production of low velocity secondary electrons by evaporating a thin layer of a suitable metal, such as magnesium, on this surface and then wholly or partially oxidizing this metal layer.

As an alternative, the cells can be of the silicon-silicon oxide type. These cells can be made as follows: First, silicon (instead of copper) is deposited on the silver-plated side of the mosaic after the asphaltum has been dissolved. A preferred method is to deposit the "silicon" in two layers, one by simultaneous evaporation of silicon and a more conducting element, such as aluminum, arsenic, titanium, copper or silver, and the second by evaporation of silicon alone. The effect of the more conducting element is to give the cell a lower internal resistance than would otherwise be obtained. The silicon (or silicon and the more conducting element) layer is then covered by evaporation of quartz (silicon dioxide) or another suitable insulator with tungsten or another suitable element such as silicon, molybdenum, or tantalum. The evaporations can be effected either simultaneously or in alternate thin layers as the layers are very thin and not very smooth, thus permitting one to partially merge with the other. Finally, a thin semitransparent film of gold, silver or other suitable conducting material is evaporated onto the small cell surfaces and the silver mask and the films on it are stripped away, leaving small sandwich-type silicon-silicon oxide photo-E. M. F. cells distributed at random over the screen. The silicon-silicon oxide cell described above is of particular advantage in the camera tube in accordance with this invention because of its low impedance. Because of this, electrons which fall back on the surface of the target remote from the beam do not charge this surface.

The operation of the arrangement shown in Fig. 1 is as follows, reference also being made to Figs. 2 and 3. Radiations from an object or field of view are projected upon the right-hand side of the mosaic target 11 by means of the lens system 17. A high velocity beam of electrons generated by the electron gun 13 is deflected over a field of the mosaic target 11 corresponding to the area covered by the radiations from the object by means of deflecting potentials applied to the deflecting plates 15 and 16. As shown in Fig. 2, the cathode ray beam is generally of such size that it covers several apertures 52 and the spaces between them. It will be appreciated that the lines indicating the beams are not accurately representative of the electron paths since obviously the electric fields adjacent the apertures of the member 50 are not uniform and produce a certain amount of convergence or divergence. When the primary beam strikes the metal member 50, secondary electrons are given off and these secondary electrons (mixed with some primary electrons which are not shown in the drawing in order to simplify it) pass through the aperture or apertures 52 adjacent the scanning spot to the collecting electrode 14. The source 37 places the plate 50 at a positive potential of from 20 to 50 volts with respect to the electrode 24 to allow only electrons originating next to an aperture to go through it, or, in other words, a field is established which discourages secondary electrons from traveling from one point of the target to another. The number of secondary electrons which pass through any particular aperture 52 is dependent upon the potential generated across the adjacent individual photo-E. M. F. cells 51 by the radiations applied thereto from the corresponding elemental area of the object. The action of the photo-E. M. F. cells 51 is somewhat analogous to that of a grid in a triode. This voltage between the semitransparent metal member and the metal screen member 50 varies the number of secondary electrons which pass through the corresponding aperture 52. This voltage has practically no effect on the primary electrons but as the number of them passing through the target 11 in a given time interval remains substantially constant, these electrons contribute only to the "average" or background current flowing through the resistor 34 and do not affect the signal current. Moreover, secondary electrons emitted from the plate 50 which do not go through the apertures 52 and are picked up by the plate 50 do not introduce distortion in the signal current as the plate 50 is maintained at a fixed potential. If any secondary electrons fall back on the side of the cells 51 remote from the electron beam, they are immediately conducted to the plate 50 as the resistance of the cells is relatively low. Unlike the storage type of camera tube using photoemissive elements wherein each photoemissive element must be discharged once per cycle, the photo-E. M. F. cells 51 can have the potential thereacross varied at will (by the change in light) and need not have this potential brought to zero once every scanning cycle. The variable current passing through the resistor 34 constitutes the video signal current and this current is amplified by the amplifier 36 in a manner well known in the art. The video current is then caused to modulate a carrier for transmission to a distant station by means well known.

Various modifications can be made in the embodiment described above without departing from the spirit of the invention, the scope of which is indicated by the appended claims.

What is claimed is:

1. An electron camera tube target comprising a metal base member, and a multiplicity of relatively small photo-E. M. F. cells on said member, each of said cells comprising silicon and an oxide of silicon.

2. An electron camera tube target comprising a metal base member, and a multiplicity of relatively small photo-E. M. F. cells on said member, each of said cells including a layer comprising silicon and a more conducting element than silicon and a layer of an oxide of silicon.

3. The combination of an envelope containing an electrically conducting plate-like member having a multiplicity of minute apertures therethrough with small photo-E. M. F. devices adjacent thereto and for which said member serves as a common terminal, the second terminals of said devices being an array on one side of said member and having no external electrical connections thereto, said array being exposable to light, there being at least one of said devices adjacent each of said apertures, means within said envelope for producing a flow of electrons through said apertures and past said array, means separated from said member and positioned on the same side thereof as the array for collecting electrons after they pass said array, and means connected to said member for maintaining the potential thereof independent of the potential or potentials of the second terminals of said devices.

4. An electron space current device for converting light variations into electrical variations comprising an enclosing envelope having therein a mosaic electron target comprising an apertured conductive member carrying a multiplicity of discrete photo-E. M. F. elements in conductive relation thereto and adjacent the apertures thereof, a wall of said envelope being light conducting to permit light to be impressed on said cells from without the envelope to energize the cells to set up voltages thereacross dependent upon the intensity of the light incident thereon, and means aligned with said target for generating electrons of such low velocity that their flow can be controlled by voltages of the order of magnitude of those produced by said cells, and means adjacent said target for setting up a force within the space adjacent said apertures for directing some of said low velocity electrons toward each of said apertures in turn.

5. The combination of elements as in claim 4 in which said photo-E. M. F. elements are contiguous to one side of said target and the means for generating the low velocity electrons comprises means for generating a beam of high velocity electrons and for directing it so that it impinges upon the side of said target remote from the photo-E. M. F. elements, thereby causing emission from said conducting member of secondary electrons which pass through said apertures under control of the voltages set up across the photo-E. M. F. elements adjacent the corresponding apertures.

6. The combination of elements as in claim 4 in which each of said discrete photo-E. M. F. elements includes silicon.

7. The combination of elements as in claim 4 in which each of said photo-E. M. F. elements comprises silicon and an oxide of silicon.

8. The combination of elements as in claim 4 in which each of said discrete photo-E. M. F. elements includes a layer comprising silicon and an element more conducting than silicon and a layer of an oxide of silicon.

GORDON K. TEAL.

REFERENCES CITED

The following references are of record in the file of this patent:

UNITED STATES PATENTS

| Number | Name | Date |
| --- | --- | --- |
| 2,045,984 | Flory | June 30, 1936 |
| 2,116,901 | Knoll | May 10, 1938 |
| 2,175,691 | Kiams | Oct. 10, 1939 |
| 2,212,923 | Miller | Aug. 27, 1940 |
| 2,162,808 | Gallup | June 20, 1939 |
| 2,140,994 | Gorlich | Dec. 20, 1938 |
| 2,175,701 | Rose | Oct. 10, 1939 |
| 2,175,689 | Gallup | Oct. 10, 1939 |
| 2,141,375 | Castro | Dec. 27, 1938 |
| 2,204,251 | Jones | June 11, 1940 |
| 1,907,124 | Ruben | May 2, 1933 |
| 2,120,765 | Orvin | June 14, 1938 |
| 1,936,514 | Lnegnick | Nov. 21, 1933 |
| 1,943,395 | Pfeiffer | Jan. 16, 1934 |
| 2,324,505 | Iams et al. | July 20, 1943 |
| 2,305,576 | Lamb | Dec. 15, 1942 |
| 2,095,782 | Wilson | Oct. 12, 1937 |

FOREIGN PATENTS

| Number | Country | Date |
| --- | --- | --- |
| 783,646 | France | Apr. 8, 1935 |